(12) United States Patent
Lainema et al.

(10) Patent No.: US 7,388,996 B2
(45) Date of Patent: Jun. 17, 2008

(54) METHOD FOR FILTERING DIGITAL IMAGES, AND A FILTERING DEVICE

(75) Inventors: Jani Lainema, Irving, TX (US);
Bogdan-Paul Dobrin, Helsinki (FI);
Marta Karczewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 365 days.

(21) Appl. No.: 09/766,238

(22) Filed: Jan. 19, 2001

(65) Prior Publication Data

US 2001/0019634 A1    Sep. 6, 2001

(30) Foreign Application Priority Data

Jan. 21, 2000   (FI)   ................... 20000122
Jan. 24, 2000   (FI)   ................... 20000141

(51) Int. Cl.
*G06K 9/40*      (2006.01)
*G06K 9/46*      (2006.01)
*H04N 7/12*      (2006.01)

(52) U.S. Cl. ............... 382/260; 382/238; 382/268; 348/409.1

(58) Field of Classification Search ........... 382/268, 382/232, 238, 248, 250, 260, 264, 267, 269, 382/275; 375/240.24, 24.29, 240.25; 348/615; 358/426.02, 426.16
See application file for complete search history.

(56) References Cited

U.S. PATENT DOCUMENTS

| 5,337,088 | A | 8/1994 | Honjo | 348/420 |
| 5,493,513 | A * | 2/1996 | Keith et al. | 709/247 |
| 5,541,668 | A | 7/1996 | Kuwahara | 348/624 |
| 5,933,541 | A | 8/1999 | Kutka et al. | 382/261 |
| 6,236,764 | B1 * | 5/2001 | Zhou | 382/266 |
| 6,275,533 | B1 * | 8/2001 | Nishi | 375/240.24 |
| 6,434,275 | B1 * | 8/2002 | Fukuda et al. | 382/275 |
| 6,496,605 | B1 * | 12/2002 | Osa | 382/268 |
| 6,563,958 | B1 * | 5/2003 | Andrew | 382/268 |
| 2004/0213344 | A1 * | 10/2004 | Hirase et al. | 375/240.2 |

FOREIGN PATENT DOCUMENTS

| EP | 0817496 | 1/1998 |
| EP | 0866621 A1 | 9/1998 |
| EP | 0895424 A2 | 2/1999 |
| EP | 0933948 A2 | 8/1999 |
| WO | WO 98/41025 | 9/1998 |
| WO | WO 00/49809 | 8/2000 |

OTHER PUBLICATIONS

IEEE Transaction on Circuits and Systems For Video Technology, vol. 9, No. 1, Feb. 1999, "A Deblocking Filter With Two Separate Modes In Block-Based Video Coding" pp. 156-160.

* cited by examiner

*Primary Examiner*—Bravesh M. Mehta
*Assistant Examiner*—Charles Kim
(74) *Attorney, Agent, or Firm*—Perman & Green, LLP

(57) ABSTRACT

The invention relates to a method for reducing visual artefacts in a digital image, which is coded by blocks (B1, B2, B3, B4) and then decoded. In the method filtering is performed to reduce visual artefacts due to a boundary (R12, R13, R24, R34) between a current block and an adjacent block (B1, B2, B3, B4). The filtering is performed after the current block (B1, B2, B3, B4) is decoded and there is a boundary available for filtering between the current block and a previously decoded block.

69 Claims, 6 Drawing Sheets

METHOD FOR FILTERING DIGITAL IMAGES, AND A FILTERING DEVICE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERAL SUBMITTED ON A COMPACT DISC

Not applicable

BACKGROUND OF THE INVENTION

1. Field of the Invention

The present invention relates to a method for reducing visual artefacts in a digital image, which is encoded and decoded by blocks, in which filtering is performed to reduce visual artefacts due to a boundary between a current block and an adjacent block. The present invention also relates to a device for reducing visual artefacts in a digital image, which is encoded and decoded by blocks, the device comprising means for performing filtering to reduce visual artefacts due to a boundary between a current block and an adjacent block. The present invention also relates to an encoder comprising means for coding and means for locally decoding a digital image by blocks, which encoder comprises means for performing filtering to reduce visual artefacts due to a boundary between a current block and an adjacent block. The present invention also relates to a decoder comprising means for decoding a digital image by blocks, which decoder comprises means for performing filtering to reduce visual artefacts due to a boundary between a current block and an adjacent block. The present invention also relates to a terminal comprising an encoder, which comprises means for coding and means for locally decoding a digital image by blocks, means for performing filtering to reduce visual artefacts due to a boundary between a current block and an adjacent block. The present invention further relates to a terminal comprising means for decoding a digital image by blocks, means for performing filtering to reduce visual artefacts due to a boundary between a current block and an adjacent block. The present invention further relates to a storage medium for storing a software program comprising machine executable steps for coding and locally decoding a digital video signal by blocks, and for performing filtering to reduce visual artefacts due to a boundary between a current block and an adjacent block. The present invention further relates to a storage medium for storing a software program comprising machine executable steps for decoding a digital video signal by blocks, and for performing filtering to reduce visual artefacts due to a boundary between a current block and an adjacent block.

2. Description of Related Art including information disclosed under 37 CFR 1.97.

Figure 1:
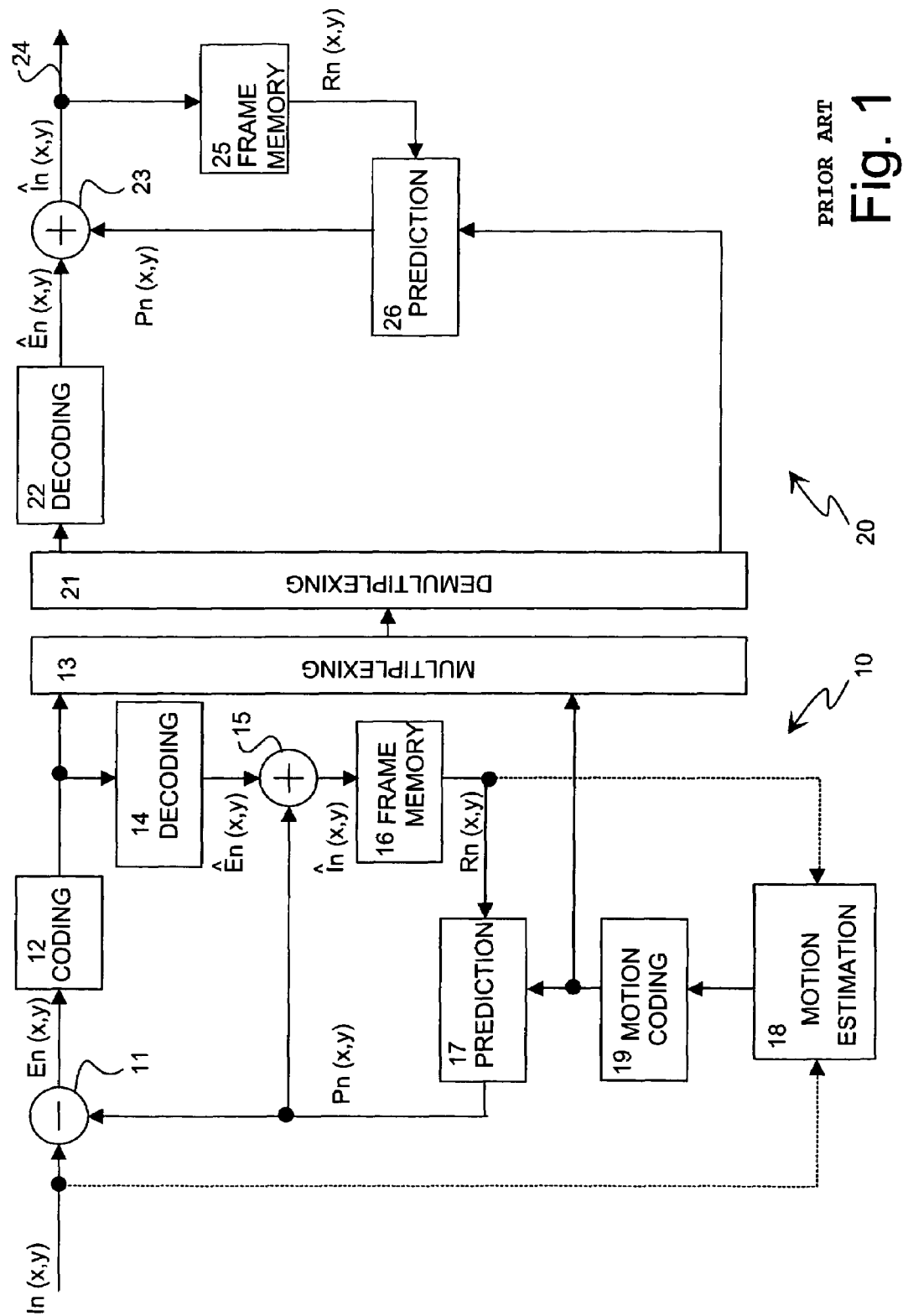

An arrangement like that shown in FIG. 1 is generally used for transferring a digital video sequence in compressed form. The digital video sequence is formed of sequential images, often referred to as frames. In some prior art digital video transmission systems, for example ITU-T H.261/H.263 recommendations, at least three frame types are defined: an I-frame (intra), a P-frame (predicted or inter), and a B-frame (bi-directional). The I-frame is generated solely on the basis of information contained in the image itself, wherein at the receiving end, this I-frame can be used to form the entire image. P-frames are formed on the basis of a preceding I-frame or P-frame, wherein at the receiving stage a preceding I-frame or P-frame is correspondingly used together with the received P-frame in order to reconstruct the image. In the composition of P-frames, for instance motion compensation is used to compress the quantity of information. B-frames are formed on the basis of one or more preceding P-frames or I-frames and/or one or more following P- or I-frames.

The frames are further divided into blocks. One frame can comprise different types of blocks. A predicted frame (e.g. inter frame) may also contain blocks that are not predicted. In other words, some blocks of a P-frame may in fact be intra coded. Furthermore, some video coders may use the concept of independent segment decoding in which case several blocks are grouped together to form segments that are then coded independently from each other. All the blocks within a certain segment are of the same type. For example, if a P-frame is composed mainly of predicted blocks and some intra-coded blocks, the frame can be considered to comprise at least one segment of intra blocks and at least one segment of predicted blocks.

As is well known, a digital image comprises an array of image pixels. In the case of a monochrome image, each pixel has a pixel value within a certain range (e.g. 0-255), which denotes the pixel's luminance. In a colour image, pixel values may be represented in a number of different ways. In a commonly used representation, referred to as the RGB colour model, each pixel is described by three values, one corresponding to the value of a Red colour component, another corresponding to the value of a Green colour component and the third corresponding to the value of a Blue colour component. Numerous other colour models exist, in which alternative representations are used. In one such alternative, known as the YUV colour model, image pixels are represented by a luminance component (Y) and two chrominance or colour difference components (U, V), each of which has an associated pixel value.

Generally, colour models that employ luminance and chrominance components provide a more efficient representation of a colour image than the RGB model. It is also known that the luminance component of such colour models generally provides the most information about the perceived structure of an image. Among other things, this allows the chrominance components of an image to be spatially subsampled without a significant loss in perceived image quality. For these reasons colour models that employ a luminance/chrominance representation are favoured in many applications, particularly those in which data storage space, processing power or transmission bandwidth is limited.

As stated above, in the YUV colour model, an image is represented by a luminance component and two chrominance components, Typically, the luminance information in the image is transformed with full spatial resolution. Both chrominance signals are spatially subsampled, for example a field of 16×16 pixels is subsampled into a field of 8×8 pixels. The differences in the block sizes are primarily due to the fact that the eye does not discern changes in chrominance equally well as changes in luminance, wherein a field of 2×2 pixels is encoded with the same chrominance value.

Typically, image blocks are grouped together to form macroblocks. The macroblock usually contains 16 pixels by 16 rows of luminance samples, mode information, and possible motion vectors. The macroblock is divided into four 8×8 luminance blocks and to two 8×8 chrominance blocks. Scanning (and, encoding/decoding) proceeds macroblock by macroblock, conventionally from the top-left to the bottom-right corner of the frame. Inside one macroblock the scanning (and encoding/decoding) order is from the top-left to the bottom-right corner of the macroblock.

Referring to FIG. 1, which illustrates a typical encoding and decoding system (codec) used, for example, in the transmission of digital video, a current video frame to be coded comes to the transmission system 10 as input data $I_n(x,y)$. The input data $I_n(x,y)$ typically takes the form of pixel value information. In the differential summer 11 it is transformed into a prediction error frame $E_n(x,y)$ by subtracting from it a prediction frame $P_n(x,y)$ formed on the basis of a previous image. The prediction error frame is coded in block 12 in the manner described hereinafter, and the coded prediction error frame is directed to a multiplexer 13. To form a new reconstructed frame, the coded prediction error frame is also directed to a decoder 14, which produces a decoded prediction error frame $\hat{E}_n(x,y)$ which is summed in a summer 15 with the prediction frame $P_n(x,y)$, resulting in a reconstructed frame $\hat{I}_n(x,y)$. The reconstructed frame is saved in a frame memory 16. To code the next frame, the reconstructed frame saved in the frame memory is read as a reference frame $R_n(x,y)$ and is transformed into a new prediction frame $P_n(x,y)$ in a motion compensation and prediction block 17 according to the formula:

$$P_n(x,y)=R_n[x+D_x(x,y), y+D_y(x,y)] \quad (1)$$

The pair of numbers $[D_x(x,y), D_y(x,y)]$ is called the motion vector of the pixel at location (x,y) and the numbers $D_x(x,y)$ and $D_y(x,y)$ are the horizontal and vertical shifts of the pixel. They are calculated in a motion estimation block 18. The set of motion vectors $[D_x(\cdot), D_y(\cdot)]$ consisting of all motion vectors related to the pixels of the frame to be compressed is also coded using a motion model comprising basis functions and coefficients. The basis functions are known to both the encoder and the decoder. The coefficient values are coded and directed to the multiplexer 13, which multiplexes them into the same data stream with the coded prediction error frame for sending to a receiver. In this way the amount of information to be transmitted is dramatically reduced.

Some frames can be partly, or entirely, so difficult to predict using only the reference frame $R_n(x,y)$ that it is not practical to use motion compensated prediction when coding them. These frames or parts of frames are coded using intra-coding without any prediction from the reference frame $R_n(x,y)$, and accordingly motion vector information relating to them is not sent to the receiver. In prior art another kind of prediction may be employed for I-frames or those parts of P-frames which are intra-coded, namely intra prediction. In this case, the reference is formed by the previously decoded and reconstructed blocks which are part of the same frame (or slice if independent segment decoding is used).

In the receiver 20, a demultiplexer 21 separates the coded prediction error frames and the motion information transmitted by the motion vectors and directs the coded prediction error frames to a decoder 22, which produces a decoded prediction error frame $\hat{E}_n(x,y)$, which is summed in a summer 23 with the prediction frame $P_n(x,y)$ formed on the basis of a previous frame, resulting in a decoded and reconstructed frame $\hat{I}_n(x,y)$. The decoded frame is directed to an output 24 of the decoder and at the same time saved in a frame memory 25. When decoding the next frame, the frame saved in the frame memory is read as a reference frame $R_n(x,y)$ and transformed into a new prediction frame in the motion compensation and prediction block 26, according to formula (1) presented above.

The coding method used in the coding of prediction error frames and in the intracoding of a frame or part of a P-frame to be sent without using motion prediction, is generally based on a transformation, the most common of which is the Discrete Cosine Transformation, DCT. The frame is divided into adjacent blocks having a size of e.g. 8×8 pixels. The transformation is calculated for the block to be coded, resulting in a series of terms. The coefficients of these terms are quantized on a discrete scale in order that they can be processed digitally. Quantization causes rounding errors, which can become visible in an image reconstructed from blocks, so that there is a discontinuity of pixel values at the boundary between adjacent blocks. Because a certain decoded frame is used to calculate the prediction frame for subsequent predicted (P) frames, these errors can be propagated in sequential frames, thus causing visible edges in the image reproduced by the receiver. Image errors of this type are called blocking artefacts, Furthermore, if intra-prediction is used, blocking artefacts may also propagate from block to block within a given frame. In this case blocking artefacts typically lead to visual effects which are specific to the type of intra prediction used. It should therefore be appreciated that there exists a significant technical problem relating to the spatial and temporal propagation of blocking artefacts in digital images that are coded for transmission and subsequently decoded.

The principles presented above are also applicable to a situation where segmented frames are used. In that case the coding and decoding is performed in segments of the frame, according to the type of blocks in each segment.

It should also be noted that although the preceding discussion and much of the following description concentrates on application of the invention to image sequences, such as digital video, the method according to the invention may also be applied to individual digital images (i.e. still images). Essentially, the method according to the invention may be applied to any digital image that is encoded and/or decoded on a block-by-block basis using any encoding/decoding method.

Furthermore, the method according to the invention may be applied to any luminance or colour component of a digital image. Taking the example of an image represented using a YUV colour model, as introduced above, the method according to the invention may be applied to the luminance (Y) component, to either chrominance component (U or V) to both chrominance components (U and V), or to all three components (Y, U and V). In this case, where it is known that the luminance component provides more perceptually important information relating to image structure and content, it may be sufficient to apply the method according to the invention only to the luminance component, but there is no limitation on the number or combination of luminance/colour/colour difference components to which the method according to the invention may be applied.

Some prior art methods are known for removing blocking artefacts. These methods are characterized by the following features:
  determining which pixels require value correction in order to remove a blocking artefact,
  determining a suitable low-pass filtering for each pixel to be corrected, based on the values of other pixels contained by a filtering window placed around the pixel, calculating a new value for the pixel to be corrected, and rounding the new value to the closest digitized pixel value.

Factors that influence the selection of a filter and the decision whether to use filtering can be, for example, the difference between the values of pixels across the block boundary, the size of the quantization step of the coefficients received as the transformation result, and the difference between the pixel values on different sides of the pixel being processed.

In prior art methods, the filtering of blocking and other types of visual artefacts is performed frame by frame, i.e. the whole frame is first decoded and then filtered. As a result, the effects of blocking artefacts easily propagate within a frame or from one frame to the next. This is especially true when predictive intra-coding is used.

It has been found that prior art methods also tend to remove lines that belong to real features of the image. On the other hand, prior art methods are not always capable of removing all blocking or blocking-related artefacts.

A primary objective of the method according to the invention is to limit the propagation of blocking artefacts within frames and from one frame to another. Another objective of the present invention is to present a new kind of filtering arrangement for removing blocking and other blocking-related artefacts which are especially visible when predictive intra-coding is used. The invention also has the objective that the method and associated device operate more reliably and efficiently than prior art solutions.

BRIEF SUMMARY OF THE INVENTION

The objectives of the invention are achieved by performing block boundary filtering substantially immediately after an image block is decoded and there is at least one block boundary available to be filtered. Among other things, this provides the advantage that the spatial and temporal propagation of blocking and other visual artefacts is limited to a greater degree than in prior art methods. Furthermore, the results of previous block boundary filtering operations can be utilised in the encoding, decoding and filtering of subsequent blocks. In other words, pixel values modified/corrected in connection with the filtering of one boundary are available for use when encoding and decoding other blocks and when filtering other blocks/block boundaries.

According to a first aspect of the invention, there is provided a method for reducing blocking and other visual artefacts (which are mainly caused by blocking artefacts) from a frame that has been coded by blocks, characterized in that the filtering is performed after the current block is decoded and there is a boundary available for filtering between the current block and a previously decoded block.

According to a second aspect of the invention, there is provided a device for implementing the method according to the invention. The device according to the invention is characterized in that the filtering is arranged to be performed after the current block is decoded and there is a boundary available for filtering between the current block and a previously decoded block.

According to a third aspect of the invention, there is provided an encoder for encoding digital images comprising a decoder that implements the method of the invention. The encoder according to the invention is characterized in that the filtering is arranged to be performed after the current block is locally decoded and there is a boundary available for filtering between the current block and a previously locally decoded block.

According to a fourth aspect of the invention, there is provided a decoder for decoding digital images that implements the method according to the invention. The decoder according to the invention is characterized in that the filtering is arranged to be performed after the current block is decoded and there is a boundary available for filtering between the current block and a previously decoded block.

According to a fifth aspect of the invention, there is provided a terminal having digital image transmission capability and implementing the method according to the invention. The terminal according to the invention is characterized in that the filtering is arranged to be performed after the current block is locally decoded and there is a boundary available for filtering between the current block and a previously locally decoded block.

According to a sixth aspect of the invention, there is provided a terminal having digital image decoding capability and implementing the method according to the invention. The terminal according to the invention is characterized in that the filtering is arranged to be performed after the current block is decoded and there is a boundary available for filtering between the current block and a previously decoded block.

According to a seventh aspect of the invention, there is provided a storage medium storing a software program comprising instructions implementing the method according to the invention. The storage medium according to the invention is characterized in that the software program further comprises machine executable steps for performing the filtering after the current block is locally decoded and there is a boundary available for filtering between the current block and a previously locally decoded block.

According to a eighth aspect of the invention, there is provided a storage medium storing a software program comprising machine executable steps for decoding a digital video signal by blocks and with instructions implementing the method according to the invention. The storage medium according to the invention is characterized in that the software program further comprises machine executable steps for performing the filtering after the current block is decoded and there is a boundary available for filtering between the current block and a previously decoded block.

Because blocking artefacts occur at block boundaries, it is advantageous to filter only pixels at block boundaries and the vicinity thereof. Edges that are part of the image itself can reside anywhere in the image area. In order that only pixels containing blocking artefacts are selected for corrective filtering and that the quality of edges that are part of the image is not affected during filtering, the following assumptions are made:

Changes in pixel value associated with edges that are part of the image, are generally larger than those associated with blocking artefacts, and those edges within the image, where the pixel value change is small, do not suffer considerably from the rounding of the pixel value differences caused by filtering.

It should be noted that the method according to the invention can be applied regardless of the method chosen to perform the actual filtering operation and the number of pixels in the vicinity of the boundary chosen for filtering. The invention relates, among other things, to the stage at which filtering is performed in the encoding/decoding process and the manner in which filtering is applied, rather than to the precise details of any particular filter implementation that may be used.

Because an image to be coded is generally divided into blocks both vertically and horizontally, the image contains both vertical and horizontal block boundaries. With regard to vertical block boundaries, there are pixels to the right and left of the boundary, and with regard to horizontal block boundaries, there are pixels above and below the boundary. In general, the location of the pixels can be described as being on a first or a second side of the block boundary.

The method and associated device according to the invention significantly limits propagation of visual anomalies due to blocking artefacts from previously reconstructed blocks to subsequently reconstructed blocks within the same frame, or within the same segment, if independent segment decoding is used. Propagation of blocking artefacts from one frame to the next is also reduced. By using the method and device according to the invention a larger number of blocking and blocking-related artefacts can be removed without weakening the real edges within the image unreasonably.

BRIEF DESCRIPTION OF THE SEVERAL VIEWS OF THE DRAWING(S)

Figures 2, 3:
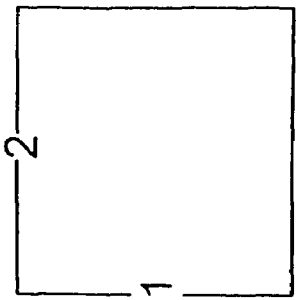
Figure 4:
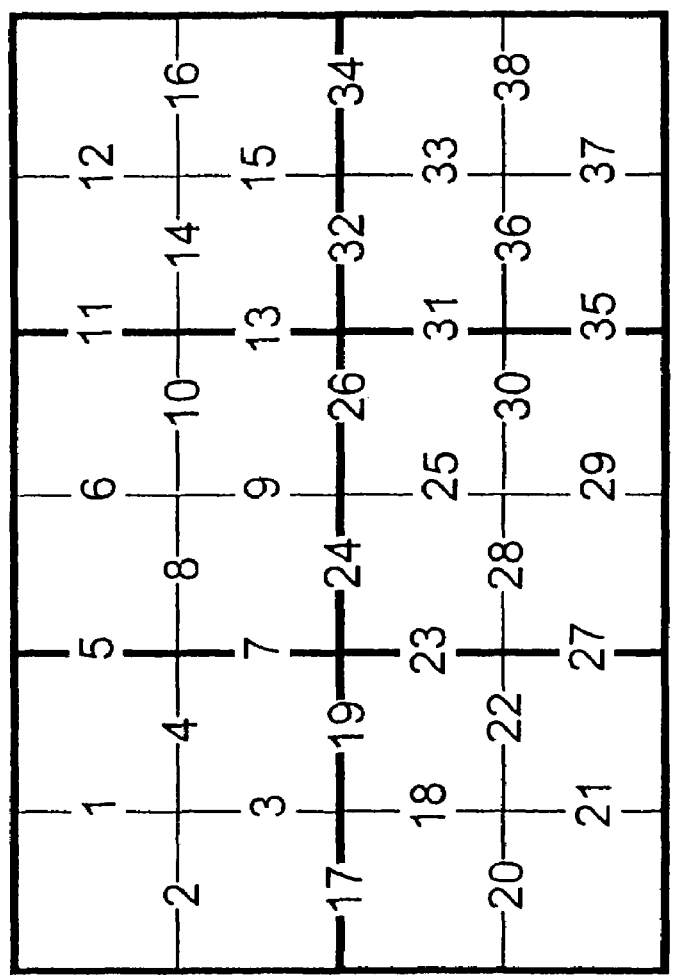
Figure 5:
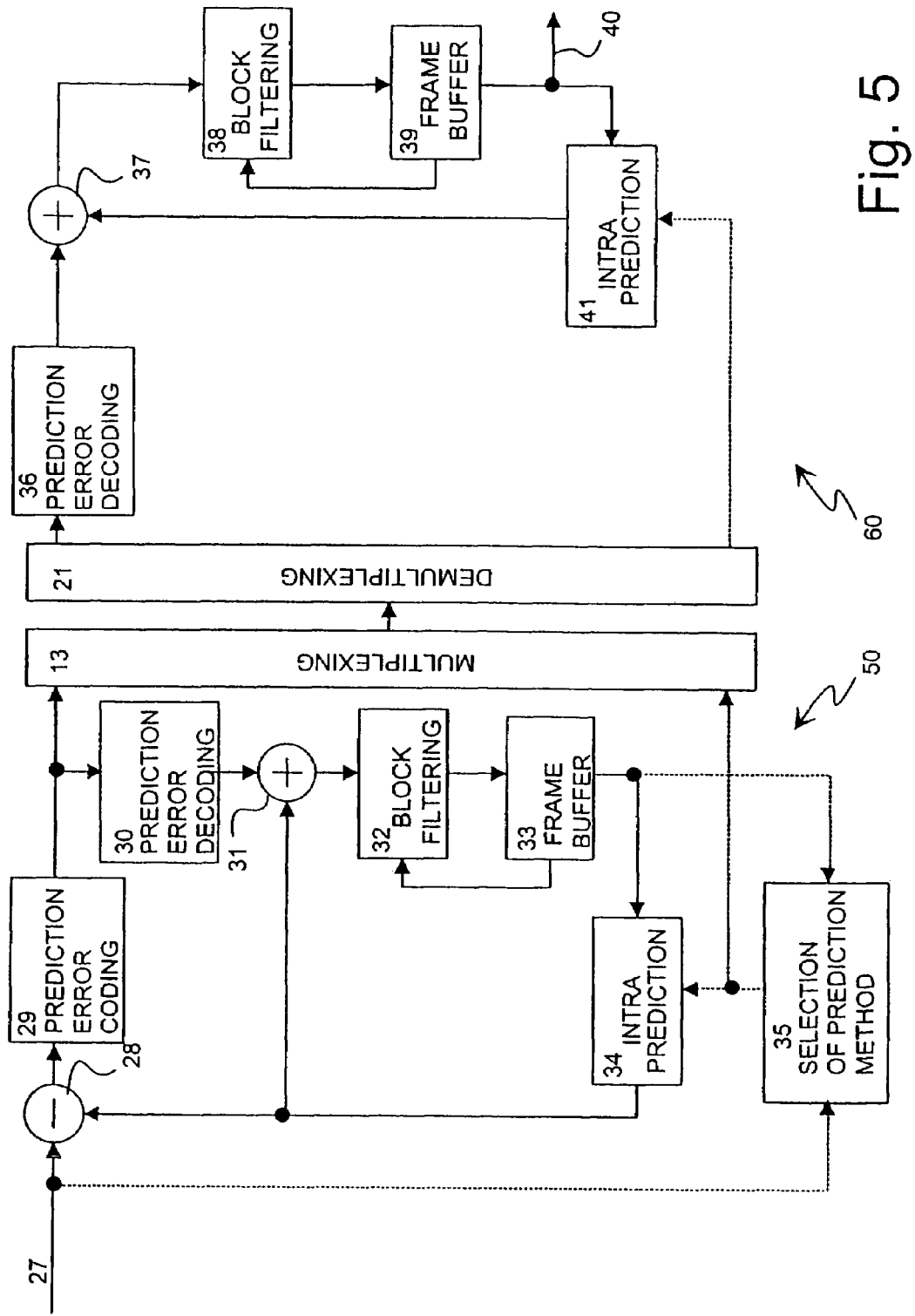
Figure 6:
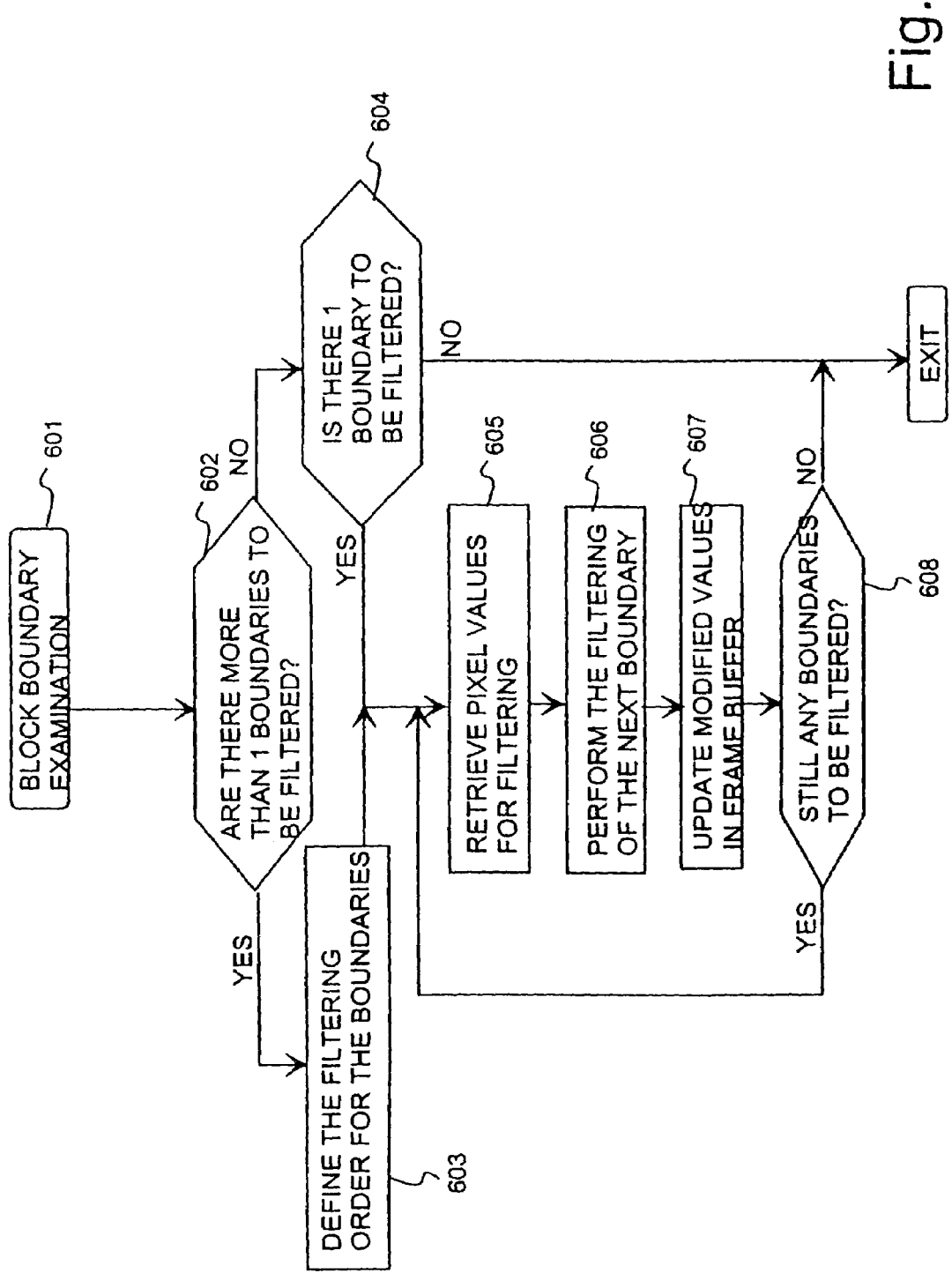
Figure 7:
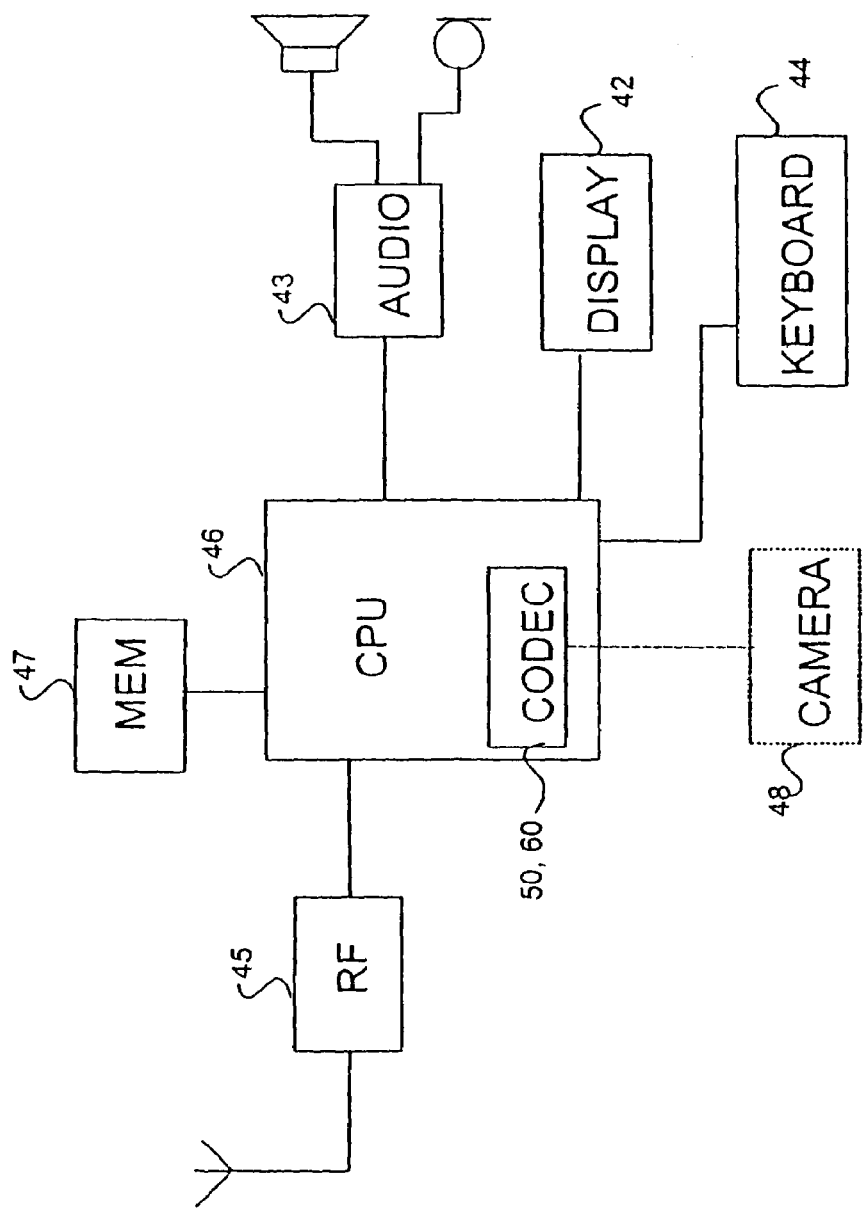

In the following, the invention will be described in more detail with reference to the preferred embodiments and the accompanying drawings, in which FIG. 1 represents a digital video encoder and decoder according to prior art, FIG. 2 represents an advantageous block scanning order in the method according to a preferred embodiment of the invention, FIG. 3 represents an advantageous block boundary filtering order according to a preferred embodiment of the invention, FIG. 4 represents an advantageous filtering order in the preferred method according to the invention, FIG. 5 represents a digital image block transfer system for implementing the method according to the invention, FIG. 6 represents a flow diagram of the method according to the invention, and FIG. 7 is a schematic representation of a portable video telecommunications device implementing a method according to the invention.

DETAILED DESCRIPTION OF THE INVENTION

In the following description of the invention and its preferred embodiments, reference will be made mostly to FIGS. 2 to 6.

In the following, the operation of a digital image decoder is described. In a digital image transfer system according to the invention, such as that illustrated in FIG. 5, the block and block boundary scanning order used in the encoder and decoder are the same, i.e. known to both encoder and decoder. However, the particular scanning order chosen is not essential for implementation of the method according to the invention. FIG. 2 shows an advantageous scanning order for a frame comprising groups of blocks, e.g. macroblocks. First, the top-left block B1 is decoded, i.e. pixel values representing e.g. the luminance information of the block are reconstructed and saved into a frame buffer. Then, the top-right block B2 is decoded and saved into the frame buffer. Now, the first vertical boundary R12 between the top-left block B1 and top-right block B2 has a decoded block at both sides, so the boundary R12 can be filtered. Advantageously, only those pixel values which are changed by the filtering are updated in the frame buffer. There are many known methods for performing filtering on the block boundary. One prior art filtering method which can be implemented with the invention is disclosed in international patent publication WO 98/41025, which is to be considered as a reference here.

Next, the bottom-left block B3 of the group of blocks in question is decoded and saved into the frame buffer. Now, the first horizontal boundary R13 between the top-left block B1 and bottom-left block B3 has a decoded block on both sides, wherein the first horizontal boundary R13 can also be filtered. In the filtering of the first vertical boundary R12 some pixel values near the first horizontal boundary R13 may have changed. Advantageously, these modified values are used in the filtering of the first horizontal boundary R13. This helps to further restrict propagation of visual artefacts from previously reconstructed blocks to subsequently reconstructed blocks within the same frame, or same segment, if independent segment encoding/decoding is used.

Now the fourth block B4 inside the macroblock is decoded and saved into the frame buffer. When decoding of the fourth block B4 is complete there exist two additional boundaries having a decoded block on either side: the second vertical boundary R34 and the second horizontal boundary R24. Therefore, both of said boundaries R34, R24 can now be filtered. In this advantageous embodiment of the method according to the invention, the filtering is performed such that the second vertical boundary R34 is filtered first, the filtering result is saved in the frame buffer, and the second horizontal boundary R24 is filtered subsequently. In a general case, if two boundaries (e.g. to the left of and above) a current block are filtered then the changed pixel values resulting from the first filtered boundary are used when filtering the other boundary.

In an advantageous embodiment of the invention, for a certain block, filtering can be performed across one, two, three, four, or none of the boundaries of the block, depending on which scanning order is adopted for coding the blocks inside a frame, or segment. In the preferred mode of implementation, the order in which blocks are reconstructed is illustrated in FIG. 2. As depicted, four blocks are grouped together to form macroblocks of 2×2 blocks. Scanning then proceeds macroblock by macroblock from the top-left to the bottom-right corner of the frame. Inside one macroblock the scanning order is from the top-left to the bottom-right corner of the macroblock. Due to this particular scanning order, in the preferred mode of implementation a maximum of two boundaries (to the left of and/or above) a block become available for filtering, when a block is reconstructed, The order in which block boundaries are advantageously examined for filtering is illustrated in FIG. 3 (left boundary first and then the upper one). The remaining boundaries, i.e. to the right and below, are filtered only when reconstruction of an adjacent block to the right and, respectively, below is completed. In the event that the block is located at the frame border or at a segment border, the corresponding block boundary/boundaries is/are not filtered since there is no adjacent block to filter across the common boundary. In the preferred mode of implementation, the order in which the block boundaries are filtered inside one frame is illustrated in FIG. 4 for a small frame size of 6×4 blocks. The numbers on the block boundaries represent the filtering order according to an advantageous embodiment of the present invention. In practical applications, the frame typically comprises more than 6×4 blocks, but it is clear from the description above how the preferred filtering order can be extended to frames and segments which comprise more (or less) than 6×4 blocks.

In general, the system described in this invention can be applied to block-based still image coding as well as to all kinds of coding in block-based video coders: I, P, B, coded and not-coded. The filtering process described in this invention works for any frame that is divided into N×M blocks for coding.

In an advantageous embodiment of the method according to the invention, filtering is applied only across those block boundaries that are adjacent to other previously reconstructed blocks, substantially as soon as a block is reconstructed (decoded). However, it is obvious that other steps can be performed between reconstruction of the block and the filtering of the block boundary/boundaries.

In the method according to the invention, filtering is applied only across block boundaries that are adjacent to previously reconstructed (decoded) blocks. In an advantageous embodiment of the invention, filtering is performed substantially as soon as a block is reconstructed and a boundary with a previously decoded block becomes available. However, it is obvious that other steps can be performed between reconstruction of the block and filtering of the block boundary/boundaries. However, once a boundary becomes available, preferably that boundary is filtered before another block is decoded.

It is also possible that the filtering is not performed substantially immediately after a block is reconstructed and a boundary to be filtered exists. For example, in another embodiment of the present invention the filtering is performed when most of the blocks of the image are reconstructed. It is also possible that the filtering and reconstruction are performed sequentially. For example, a certain amount of blocks are reconstructed and then the filtering is performed on such boundaries which are available for filtering.

If independent segment decoding is used, filtering is only applied across those block boundaries that are adjacent to previously reconstructed blocks belonging to the same segment as the current block.

A particularly advantageous feature of the method according to the invention is the fact that the result of filtering is made available to the digital image coding system before reconstructing a subsequent block in the frame. This is especially advantageous for predictive intra-coding where prediction of a block is performed with reference to previously reconstructed blocks within the same frame (or segment, if independent segment decoding is utilised). Thus, the present invention is advantageous when used in connection with any block coding scheme in which blocks are predicted from previously reconstructed blocks within the same frame or the same segment. It significantly reduces or prevents the propagation of visual artefacts from previously reconstructed blocks to subsequently reconstructed blocks within the same frame, or the same segment, if independent segment encoding/decoding is used. Reconstruction of a certain block is therefore dependent on filtered data derived from previously reconstructed blocks. Thus, in order to avoid encoder-decoder mismatch, the decoder should not only execute the same filtering scheme, but should also perform filtering operations in the same order as the encoder. The method also reduces or prevents propagation of blocking artefacts from one frame to the next, because blocking artefacts in a frame used e.g. in inter frame prediction are reduced by the method according to the invention.

In the following, the transmission and reception of video frames in a video transmission system is described with reference to the digital image transfer system presented in FIG. 5 and the flow diagram in FIG. 6. Operation of the block boundary filtering method according to the invention will first be described in connection with the encoder of the transmission system, in the situation where a frame of a digital image sequence is encoded in intra (I-frame) format and using some form of intra block prediction, in which a block of the intra frame may be coded with reference to other previously coded intra blocks within the same frame. Filtering of block boundaries in the decoder of the transmission system will then be described for a corresponding intra-coded frame received for decoding at the receiver. Finally, application of the block boundary filtering method according to the invention to inter-coded frames (P-frames) will be described.

Assuming that a frame is to be encoded in intra format using some form of intra prediction, encoding of the frame proceeds as follows. The blocks of the frame to be coded are directed one by one to the encoder 50 of the video transfer system presented in FIG. 5. The blocks of the frame are received from a digital image source, e.g. a camera or a video recorder (not shown) at an input 27 of the image transfer system. In a manner known as such, the blocks received from the digital image source comprise image pixel values. The frame can be stored temporarily in a frame memory (not shown), or alternatively, the encoder receives the input data directly block by block.

The blocks are directed one by one to a prediction method selection block 35 that determines whether the pixel values of the current block to be encoded can be predicted on the basis of previously intra-coded blocks within the same frame or segment. In order to do this, the prediction method selection block 35 receives input from a frame buffer of the encoder 33, which contains a record of previously encoded and subsequently decoded and reconstructed intra blocks. In this way, the prediction method selection block can determine whether prediction of the current block can be performed on the basis of previously decoded and reconstructed blocks. Furthermore, if appropriate decoded blocks are available, the prediction method selection block 35 can select the most appropriate method for predicting the pixel values of the current block, if more than one such method may be chosen. It should be appreciated that in certain cases, prediction of the current block is not possible because appropriate blocks for use in prediction are not available in the frame buffer 33. In the situation where more than one prediction method is available, information about the chosen prediction method is supplied to multiplexer 13 for further transmission to the decoder. It should also be noted that in some prediction methods, certain parameters necessary to perform the prediction are transmitted to the decoder. This is, of course, dependent on the exact implementation adopted and in no way limits the application of the block boundary filter according to the invention.

Pixel values of the current block are predicted in the intra prediction block 34. The intra prediction block 34 receives input concerning the chosen prediction method from the prediction method selection block 35 and information concerning the blocks available for use in prediction from frame buffer 33. On the basis of this information, the intra prediction block 34 constructs a prediction for the current block. The predicted pixel values for the current block are sent to a differential summer 28 which produces a prediction error block by taking the difference between the pixel values of the predicted current block and the actual pixel values of the current block received from input 27. Next, the error information for the predicted block is encoded in the prediction error coding block in an efficient form for transmission, for example using a discrete cosine transform (DCT). The encoded prediction error block is sent to multiplexer 13 for further transmission to the decoder.

The encoder of the digital image transmission system also includes decoding functionality. The encoded prediction error of the current block is decoded in prediction error decoding block 30 and is subsequently summed in summer 31 with the predicted pixel values for the current block. In this way, a decoded version of the current block is obtained. The decoded current block is then directed to a block boundary filter 32, implemented according to the, method of the invention. Now referring to the flow chart of FIG. 6, the block boundary filter 32 examines 602, 604, if the current (just decoded) block has boundaries that can be filtered. In order to determine if such boundaries exist, the block boundary filter examines the contents of the frame buffer 33. If more than one such boundary exists, the block boundary filter determines 603 the filtering order to be used in filtering the boundaries. If at least one boundary is found, the block boundary filter retrieves 605 those pixel values that belong to the adjacent block of the present boundary to be used in the filtering process. The block boundary filter performs the filtering 606 according to a preferred filtering method and updates at least the modified pixel values in the current block and the values of pixels filtered in previously decoded blocks stored in the frame buffer 33. The block boundary filter then examines 608 whether there are still boundaries to be filtered. If other boundaries are to be filtered the process returns to step 605. The block filter performs analogous operations on each block of the frame being coded until all blocks have been encoded and locally decoded. As each block is filtered it is made available for use e.g. in the prediction and/or filtering of subsequent blocks by storing it in the frame buffer 33.

The operation of the block boundary filtering method according to the invention will now be described in connection with the receiver of a digital image transmission system. Here, use of the filter is described in connection with the decoding of a frame, assumed to have been encoded in intra format using some form of intra prediction method in which the pixel values of a current block are predicted on the basis of previously encoded image blocks within the same frame.

Here it is also assumed that the receiver receives the blocks that form a digital image frame one by one from a transmission channel. It should be appreciated that in other embodiments, the receiver may receive a complete frame to be decoded, or alternatively may retrieve the digital image to be decoded from a file present on some form of storage medium or device. In any case, operation of the block boundary filtering method according to the invention is performed on a block-by-block basis, as described below.

In the receiver 60, a demultiplexer receives and demultiplexes coded prediction error blocks and prediction information transmitted from the encoder 50. Depending on the prediction method in question, the prediction information may include parameters used in the prediction process. It should be appreciated that in the case that only one intra prediction method is used, information concerning the prediction method used to code the blocks is unnecessary, although it may still be necessary to transmit parameters used in the prediction process. In FIG. 5, dotted lines are used to represent the optional transmission and reception of prediction method information and/or prediction parameters. Assuming more than one intra prediction method may be used, information concerning the choice of prediction method for the current block being decoded is provided to intra prediction block 41. Intra prediction block 41 examines the contents of frame buffer 39 to determine if there exist previously decoded blocks to be used in the prediction of the pixel values of the current block. If such image blocks exist, intra prediction block 41 predicts the contents of the current block using the prediction method indicated by the received prediction method information and possible prediction-related parameters received from the encoder. Prediction error information associated with the current block is received by prediction error decoding block 36 which decodes the prediction error block using an appropriate method. For example, if the prediction error information was encoded using a discrete cosine transform, the prediction error decoding block performs an inverse DCT to retrieve the error information. The prediction error information is then summed with the prediction for the current image block in summer 37 and the output of the summer is applied to block boundary filter 38. Block boundary filter 38 applies boundary filtering to the newly decoded image block in a manner analogous to the block boundary filter of the encoder (block 32). Accordingly, block boundary filter 38 examines 602, 604, if the current (newly decoded) block has boundaries that can be filtered. In order to determine if such boundaries exist, the block boundary filter 38 examines the contents of frame buffer 39 which contains previously decoded and reconstructed image blocks. If more than one such boundary exists, the block boundary filter determines 603 the filtering order to be used in filtering the boundaries. Advantageously, this order is identical to that used in the boundary filter 32 of the encoder. If at least one boundary is found, the block boundary filter retrieves 605 those pixel values that belong to the adjacent block of the present boundary for use in the filtering process. The block boundary filter performs the filtering 606 according to a preferred filtering method (advantageously identical to that used in the encoder) and updates at least the modified pixel values in the current block and the values of pixels filtered in previously decoded blocks stored in the frame buffer 39. The block boundary filter then examines 608 whether there are still boundaries to be filtered. If other boundaries are to be filtered the process returns to step 605.

The block filter performs analogous operations on each block of the frame, substantially immediately after each block is decoded, until all blocks have been decoded and their boundaries appropriately filtered. As each block is filtered it is made available for use e.g. in the prediction and/or filtering subsequent blocks by storing it in the frame buffer 39. Furthermore, as each block is decoded and its boundaries filtered by applying the method according to the invention, it is directed to the output of the decoder 40, for example to be displayed on some form of display means. Alternatively, the image frame may be displayed only after the whole frame has been decoded and accumulated in the frame buffer 39.

In the paragraphs above, the method according to the invention was described in connection with the filtering of block boundaries in a frame coded in intra format and further using intra prediction methods. It should be appreciated that the method according to the invention may be applied in an exactly analogous manner for filtering block boundaries between intra coded blocks that form part of an otherwise inter-coded frame. Alternatively, the method may be applied to inter coded image blocks. It may also be applied for filtering block boundaries between different types of coded blocks regardless of the type of block in question.

In the case of inter coded image blocks, each inter coded block is predicted based on information concerning its motion between a current frame and a reference frame and the operations of the encoder are as follows: A prediction error block is formed based on the difference between the prediction for the block and the actual contents of the block. The prediction error block is coded in a way known as such, for example using a DCT and transmitted to the decoder together with information, for example motion coefficients, representing the motion of the block In the encoder, the coded prediction error is further decoded and summed with the prediction for the current block to produce a decoded and reconstructed block that forms part of a prediction reference frame to be used in connection with motion compensated prediction coding of the next frame in the sequence. As was the case in the example given above concerning intra coding, a block boundary filter can be implemented for use in connection with inter coded blocks in such a way that it receives and filters inter coded blocks of the current frame substantially immediately after they have been decoded. An equivalent arrangement may be used in connection with the decoding of inter coded blocks received at the receiver of a digital image transmission system.

The block carrying out the filtering method according to the invention is particularly advantageously implemented in a digital signal processor or a corresponding general purpose device suited to processing digital signals, which can be programmed to apply predetermined processing functions to signals received as input data. The measures according to FIG. 6 can be carried out in a separate signal processor or they can be part of the operation of such a signal processor which also contains other arrangements for signal processing.

A storage medium can be used for storing a software program comprising machine executable steps for performing the method according to the invention. Then, in an advantageous embodiment of the invention, the software program can be read from the storage medium to a device comprising programmable means, e.g. a processor, for performing the method of the invention.

In the method and device according to the invention, the number of pixels selected for filtering can vary, and it is not necessarily the same on different sides of the block boundary. The number of pixels may be adapted according to the general features of the image information contained by the frame. Furthermore, many filtering methods can be applied with the present invention. In some intra-prediction methods it is not necessary to send the intra prediction information in addition to the coded differential blocks to the receiver 60. The definitions of filtering order above have also been intended only as examples.

A particularly advantageous use of the invention is in mobile teleconferencing applications, digital television receivers and other devices that at least receive and decode digital video images.

FIG. 7 presents a simplified schematic diagram of a mobile terminal 41 intended for use as a portable video telecommunications device and applying the deblocking filter method according to the invention. The mobile terminal comprises advantageously at least display means 42 for displaying images, audio means 43 for capturing and reproducing audio information, keyboard 44 for inputting e.g. user commands, radio part 45 for communicating with a mobile telecommunications network, processing means 46 for controlling the operation of the device, memory means 47 for storing information, and preferably a camera 48 for taking images.

The present invention is not solely restricted to the above presented embodiments, but it can be modified within the scope of the appended claims.

The invention claimed is:

1. A method of encoding a digital image comprising a plurality of image blocks, the method comprising:
    decoding a first encoded image block;
    performing a filtering operation across a block boundary between the first decoded image block and a previously decoded image block adjacent to the first decoded image block such that the pixel value of at least one decoded pixel in the first decoded image block is modified by the filtering operation; and
    performing a prediction for at least one pixel value of a second block, the second block adjacent to the first decoded image block, wherein the prediction is performed based on the modified pixel value of the first decoded image block by the filtering operation, wherein filtering is performed due to more than one boundary between the first decoded image block and previously decoded image blocks in a sequential boundary scanning order that is based on a scanning order used in the encoding process.

2. A method according to claim 1, wherein the decoding of the first image block comprises performing motion compensated prediction with respect to a reference image.

3. A method according to claim 1, wherein decoding of the first encoded image block comprises performing prediction with reference to a previously decoded image block adjacent to the first block.

4. A method according to claim 1, wherein the filtering operation across the boundary between the first decoded image block and the previously decoded image block is performed immediately after the first image block is decoded.

5. A method according to claim 1, wherein filtering operation across the boundary between the first decoded image block and a previously decoded image block adjacent to the first decoded image block is performed before performing the prediction for the second block.

6. A method according to claim 1, wherein filtering is performed due to more than one boundary between the first decoded image block and previously decoded image blocks adjacent to the first decoded image block.

7. A method according to claim 6, wherein filtering due to more than one boundary is performed sequentially on more than one boundary in a certain boundary scanning order.

8. A method according to claim 7, wherein the order of filtering boundaries is selected such that a boundary to the left of the first decoded image block is filtered before a boundary to the top of the first decoded image block.

9. A method according to claim 1, wherein image blocks, are grouped into macroblocks, and filtering is performed macroblock by macroblock according to a certain macroblock scanning order.

10. A method according to claim 9, wherein filtering is performed for all boundaries within a macroblock before filtering to reduce visual artifacts is performed within the next macroblock in the macroblock scanning order.

11. A method according to claim 9, wherein the digital image comprises a plurality of segments of image blocks and only boundaries between adjacent decoded image blocks that belong to the same segment are filtered.

12. A method according to claim 1, wherein the digital image comprises a plurality of segments of image blocks and only boundaries between adjacent decoded image blocks that belong to the same segment are filtered.

13. A method according to claim 1, wherein the prediction operation further comprises performing a prediction for at least one other pixel value of the second block based on a modified pixel value of a third block, the third block adjacent to the second image block, the modified pixel values of the third block obtained by a filtering operation performed across a block boundary between the third decoded image block and a previously decoded image block adjacent to the third block.

14. An encoder for encoding a digital image comprising a plurality of image blocks, the encoder configured to:
   encode a first image block to form a first encoded image block;
   decode the first encoded image block to form a first decoded image block;
   the encoder comprising a filter arranged to perform a filtering operation across a block boundary between the first decoded image block and a previously decoded image block adjacent to the first decoded image block, such that a pixel value of at least one decoded pixel in the first decoded image block is modified by the filtering operation; and
   the encoder further configured to perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

15. An encoder according to claim 14, wherein the encoder is configured to encode the first image block by performing motion compensated prediction with respect to a reference image.

16. An encoder according to claim 14, wherein the encoder is configured to encode the first image block by performing prediction with reference to a previously encoded image block adjacent to the first block.

17. An encoder according to claim 14, wherein the filter is arranged to operate immediately after the first image block is decoded.

18. An encoder according to claim 14, wherein the filter is arranged to operate due to more than one boundary between the first decoded image block and previously decoded image blocks adjacent to the first decoded image block.

19. An encoder according to claim 18, wherein the filter is arranged to operate due to more than one boundary by filtering the boundaries sequentially in a certain boundary scanning order.

20. An encoder according to claim 14, wherein the filter is arranged to use the modified pixel value due to at least one other boundary between decoded image blocks.

21. An encoder according to claim 14, wherein image blocks are grouped into macroblocks, and the filter is arranged to filter the image macroblock by macroblock according to a certain macroblock scanning order.

22. An encoder according to claim 21, the encoder further arranged to encode and subsequently decode the image blocks of a macroblock in a certain block scanning order.

23. An encoder according to claim 21, wherein the filter is arranged to operate immediately after the first image block is decoded.

24. An encoder according to claim 21, wherein the filter is arranged to operate due to more than one boundary between the first decoded image block and previously decoded image blocks adjacent to the first decoded image blocks.

25. An encoder according to claim 24, wherein the filter is further arranged operate due to more than one boundary by filtering the boundaries sequentially in a certain boundary scanning order.

26. An encoder according to claim 21, wherein the digital image comprises a plurality of segments of image blocks and the filter is arranged to operate due to boundaries between adjacent decoded image blocks that belong to the same segment.

27. An encoder according to claim 14, wherein the digital image comprises a plurality of segments of image blocks and the filter is arranged to operate due to boundaries between adjacent decoded image blocks that belong to the same segment.

28. An encoder according to claim 14, wherein the encoder is further configured to perform a prediction for at least one other pixel value of the second block based on a modified pixel value of a third block, the third block adjacent to the second image block, the modified pixel values of the third block obtained by a filtering operation performed across a block boundary between the third decoded image block and a previously decoded image block adjacent to the third block.

29. A decoder for decoding an encoded digital image comprising a plurality of encoded image blocks, the decoder configured to:
   decode a first encoded image block to form a first decoded image block;
   the decoder comprising a filter arranged to perform a filtering operation across a block boundary between the first decoded image block and a previously decoded image block adjacent to the first decoded image block, such that pixel value of at least one decoded pixel in the first decoded image block is modified by the filtering operation; and
   the decoder further configured to perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

30. A decoder according to claim 29, wherein the decoder is configured to decode the first image block by performing motion compensated prediction with respect to a reference image.

31. A decoder according to claim 29, wherein the decoder is configured to decode the first encoded image block by performing a prediction with reference to a previously decoded image block adjacent to the first block.

32. A decoder according to claim 29, wherein the filter is arranged to operate immediately after the first image block is decoded.

33. A decoder according to claim 29, wherein the filter is arranged to operate due to more than one boundary between the first decoded image block and previously decoded image blocks adjacent to the first decoded image block.

34. A decoder according to claim 33, wherein the filter is arranged to operate due to more than one boundary by filtering the boundaries sequentially in a certain boundary scanning order.

35. A decoder according to claim 29, wherein the filter is arranged to use the modified pixel value when filtering due to at least one other boundary between decoded image blocks.

36. A decoder according to claim 29, wherein the image blocks are grouped into macroblocks, each macroblock comprising a certain number of image blocks, and the filter is arranged to filter the image macroblock by macroblock according to a certain macroblock scanning order.

37. A decoder according to claim 36, wherein the decoder is further arranged to decode the encoded image blocks of a macroblock in a certain block scanning order.

38. A decoder according to claim 36, further arranged to decode all the encoded image blocks of a given macroblock in the macroblock scanning order before decoding the encoded image blocks of the next macroblock in the macroblock scanning order.

39. A decoder according to claim 36, wherein the filter is arranged to operate immediately after the first encoded image block is decoded.

40. A decoder according to claim 39, wherein the filter is arranged to operate due to more than one boundary between the first decoded image block and previously decoded image blocks adjacent to the first decoded image block.

41. A decoder according to claim 40, wherein the filter is further arranged to operate due to more than one boundary by filtering the boundaries sequentially in a certain boundary scanning order.

42. A decoder according to claim 36, wherein the digital image comprises a plurality of segments of image blocks and the filter is arranged to operate due to boundaries between adjacent decoded image blocks that belong to the same segment.

43. A decoder according to claim 29, wherein the digital image comprises a plurality of segments of image blocks and the filter is arranged to operate due to boundaries between adjacent decoded image blocks that belong to the same segment.

44. A decoder according to claim 29, wherein the decoder is further configured to perform a prediction for at least one other pixel value of the second block based on a modified pixel value of a third block, the third block adjacent to the second image block, the modified pixel values of the third block obtained by a filtering operation performed across a block boundary between the third decoded image block and a previously decoded image block adjacent to the third block.

45. A terminal device comprising an encoder for encoding a digital image comprising a plurality of image blocks, the encoder configured to:
  encode a first image block to form a first encoded image block;
  decode the first encoded image block to form a first decoded image block;
  perform a filtering operation across a block boundary between the first decoded image block and a previously decoded image block adjacent to the first decoded image block, such that the pixel value of at least one decoded pixel in the first decoded image block is modified by the filtering operation; and
  perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

46. A terminal device according to claim 45, wherein the terminal device is a mobile terminal.

47. A terminal according to claim 45, wherein the terminal device is a wireless terminal of a mobile communications system.

48. A storage medium comprising a computer program for operating a computer as an encoder for encoding a digital image comprising a plurality of image blocks, which are grouped into macroblocks, each macroblock comprising a certain number of image blocks, the computer program comprising:
  program code for encoding a first image block to form a first encoded image block;
  program code for decoding the first encoded image block to form a first decoded image block;
  program code for implementing a filtering operation across a block boundary between the first decoded image block and a previously decoded image block adjacent to the first decoded image block, such that pixel value of at least one decoded pixel in the first decoded image block is modified by the filtering operation; and,
  program code for performing a prediction for at least one pixel value of a second block, the second block adjacent to the first decoded image block,
  wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

49. A storage medium comprising a computer program for operating a computer as a decoder for decoding an encoded digital image, said encoded digital image comprising a plurality of encoded image blocks grouped into macroblocks, each macroblock comprising a certain number of image blocks, the computer program comprising:
  program code for decoding a first encoded image block to form a first decoded image block;
  program code for implementing a filtering operation across a block boundary between the first decoded image block and a previously decoded image block adjacent to the first decoded image block such that pixel value of at least one decoded pixel in the first decoded image block is modified by filtering operation; and
  program code for performing a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

50. A terminal device comprising an encoder for encoding a digital image comprising a plurality of image blocks which are grouped into macroblocks, each macroblock comprising a certain number of image blocks, the encoder configured to:
  encode a first image block to form a first encoded image block;

decode the first encoded image block to form a first decoded image block;

perform a filtering operation across a block boundary between the first decoded image block and a previously decoded image block adjacent to the first decoded image block, such that pixel value of at least one decoded pixel in the first decoded image block is modified by the filtering operation; and perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

51. A terminal device according to claim 50, wherein the terminal device is a mobile terminal.

52. A terminal according to claim 50, wherein the terminal device is a wireless terminal of a mobile communications system.

53. A terminal device comprising a decoder for decoding an encoded digital image, said encoded digital image comprising a plurality of encoded image blocks, the decoder configured to:

decode a first encoded image block to form a first decoded image block;

perform a filtering operation across a block boundary between the first decoded image block and a previously decoded image block adjacent to the first decoded image block, such that pixel value of at least one decoded pixel in the first decoded image block is modified by the filtering operation; and perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

54. A terminal device according to claim 53, wherein the terminal device is a mobile terminal.

55. A terminal according to claim 53, wherein the terminal device is a wireless terminal of a mobile communications system.

56. A terminal device comprising a decoder for decoding an encoded digital image, said encoded digital image comprising a plurality of encoded image blocks grouped into macroblocks, each macroblock comprising a certain number of image blocks, the decoder configured to:

decode a first encoded image block to form a first decoded image block;

perform a filtering operation across a block boundary between the first decoded image block and a previously decoded image block adjacent to the first decoded image block such that pixel value of at least one decoded pixel in the first decoded image block is modified by the filtering operation; and perform a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

57. A terminal device according to claim 56, wherein the terminal device is a mobile terminal.

58. A terminal according to claim 56, wherein the terminal device is a wireless terminal of a mobile communications system.

59. A method of decoding an encoded digital image comprising a plurality of image blocks, the method comprising:

decoding a first image block;

performing a filtering operation across a block boundary between the first decoded image block and a previously decoded image block such that the pixel value of at least one decoded pixel in the first decoded image block is modified by the filtering operation; and performing a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

60. A method according to claim 59, wherein the decoding of the first image block comprises performing motion compensated prediction with respect to a reference image.

61. A method according to claim 59, wherein the decoding of the first image block comprises performing prediction with reference to a previously coded image block adjacent to the first block.

62. A method according to claim 59, wherein the filtering operation across the boundary between the first decoded image block and the previously decoded image block is performed immediately after the first image block is decoded.

63. A method according to claim 59, wherein the filtering operation across the boundary between the first decoded image block and the previously decoded image block is performed immediately before performing the prediction for the second block.

64. A method according to claim 59, wherein the filtering operation is performed due to more than one boundary between the first decoded image block and previously decoded image blocks adjacent to the first decoded image block.

65. A method according to claim 59, wherein the prediction operation further comprises performing a prediction for at least one other pixel value of the second block based on a modified pixel value of a third block, the third block adjacent to the second image block, the modified pixel values of the third block obtained by a filtering operation performed across a block boundary between the third decoded image block and a previously decoded image block adjacent to the third block.

66. A method according to claim 59, wherein the image blocks are grouped into macroblocks, and the filtering operation between the first decoded image block and the previously decoded image block is performed for all boundaries within a macroblock before filtering is performed within the next macroblock in the scanning order.

67. A method according to claim 59, wherein the digital image comprises a plurality of segments of image blocks and the filtering is performed due to boundaries between adjacent decoded image blocks that belong to the same segment.

68. An encoder for encoding a digital image comprising a plurality of image blocks, the encoder comprising:
- means for encoding a first image block to form a first encoded image block;
- means for decoding the first encoded image block to form a first decoded image block;
- means for performing a filtering operation across a block boundary between the first decoded image block and a previously decoded image block adjacent to the current decoded image block, such that pixel value of at least one decoded pixel in the first decoded image block is modified by the filtering operation; and
- means for performing a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

69. A decoder for decoding an encoded digital image comprising a plurality of encoded image blocks, the decoder comprises:
- means for decoding a first encoded image block to form a first decoded image block;
- means for performing a filtering operation across a block boundary between the first decoded image block and a previously decoded image block adjacent to the first decoded image block, such that pixel value of at least one decoded pixel in the first decoded image block is modified by the filtering operation; and
- means for performing a prediction for at least one pixel value of a second block, the second block adjacent to the first decoded image block, wherein the prediction is performed based on the modified pixel value of the first block by the filtering operation, wherein filtering is performed due to more than one boundary between the first decoded image block and previously decoded image blocks in a sequential boundary scanning order that is based on a scanning order used in the encoding process.

* * * * *